United States Patent Office 3,136,640
Patented June 9, 1964

3,136,640
TREATMENT OF SEED
Havva Rabinovitch, London, England, assignor to Laboratories for Applied Biology Limited, London, England, a British company
No Drawing. Filed Feb. 6, 1961, Ser. No. 87,104
Claims priority, application Great Britain Feb. 9, 1960
7 Claims. (Cl. 99—4)

This invention is for improvements in or relating to the treatment of seed and in particular for the treatment of bird seed.

Seed for feeding to birds, especially birds in captivity or birds kept as pets, for example budgerigars may be treated with vitamins, for example vitamin D, by applying the vitamins for example in solution to the whole seed. As a result of the treatment, the vitamins are mainly or wholly deposited on the surface of the seed. Most birds tend to discard the seed husk and the vitamin on the husk surface is therefore mainly wasted. Birds do not in general accept seed from which the husks have been removed.

It is an object of the present invention to provide a process for introducing materials, especially physiologically-active materials, into bird seed, in which a substantial proportion of the materials has penetrated to the kernel of the seed.

According to the present invention there is provided a process for introducing materials for example physiologically-active materials into bird seed, which process comprises splitting the seed husk by means of hot water or steam, treating the seed with a solution of fine suspension of one or more of the materials to be introduced into the seed and causing or allowing the treated seed to dry.

After the seed husk has been split by means of hot water or steam the seed may be dried for example at a temperature not exceeding 50° C.

The materials to be introduced into the seed, e.g., physiologically-active substance or substances may be dissolved for example in an organic solvent such as ethyl alcohol or may be dissolved in or suspended in water or an aqueous medium.

After having been treated with the solution or dispersion of the material to be added, the seed is dried by causing or allowing the solvent or dispersion medium to evaporate for example at room temperature and this evaporation may be assisted by means of reduced pressure.

Among the materials which may be introduced into seed by the employment of the present invention may be mentioned antibiotics, hormones or trace elements with or without admixture with one or more vitamins.

The vitamin may consist of or include vitamin $B_1$, vitamin $B_{12}$, the vitamin B complex, vitamin A, vitamin D, or vitamin E.

Examples of other materials that may be introduced include chloramphenicol, furazone, penicillin and mandelamine.

Following is a description by way of example of a method of carrying the present invention into effect.

*Example*

The husk of bird seed is first split by either of the following methods.

*Method A.*—Twelve grams of canary seed was added to 25 ml. of boiling water and boiling was continued for 10 minutes. The seed was separated from the water and dried at a temperature not exceeding 50° C.

*Method B.*—Twelve grams of canary seed was supported on a perforated disc placed in a vertical cylindrical vessel and steam was passed therethrough for from 10 to 15 minutes. The seed was then removed.

Seed treated by Method A above was added to 96% ethyl alcohol and a concentrated solution of vitamin $B_1$ in 96% alcohol was added, the amount of vitamin being such that there was approximately 1 mg. of vitamin for each 100 g. of seed. The seed was allowed to stand in the alcoholic solution for 24 hours and the alcohol was then decanted off and the seed allowed to stand in the air so that the alcohol evaporated from it.

In an alternative process removal of the alcohol from the seed was effected with the aid of vacuum.

Instead of vitamin $B_1$, vitamin $B_{12}$ was employed or a mixture of both vitamins was used. Other tests have been carried out in which vitamin A, the vitamin B complex, vitamin D and vitamin E have been used.

In further examples according to the present invention various materials including specific antibiotics and other drugs have been introduced into seed, which seed has been successfully used in the therapeutic treatment of birds in captivity.

I claim:

1. A process for introducing physiologically active materials into bird seed, which process comprises treating the seed with a member selected from the group consisting of boiling water and steam to split the seed husk without removing the husk from the seed kernel, treating the seed with the physiologically active material in a liquid medium to introduce said material into the seed kernel and then removing the liquid medium while retaining the husk on the kernel.

2. A process as claimed in claim 1 wherein the seed is treated with hot water and then dried at a temperature not exceeding 50° C. before treatment with the physiologically active materials.

3. A process as claimed in claim 2 wherein the water is boiling water.

4. A process for introducing physiologically active materials into bird seed, which process comprises treating the seed with steam to split the seed husk without removing the husk from the seed kernel, treating the seed with the physiologically active material in a liquid medium to introduce said material into the seed kernel and then removing the liquid medium while retaining the husk on the kernel.

5. A process as claimed in claim 4 wherein the physiologically active material is at least one material selected from the group consisting of vitamin A, vitamin $B_1$, vitamin $B_{12}$, the vitamin B complex, vitamin D, vitamin E, chloramphenicol, furazone, penicillin and mandelamine.

6. A process as claimed in claim 5 wherein the medium containing the physiologically active material is an alcoholic medium.

7. A process as claimed in claim 4 wherein the bird seed is canary seed.

References Cited in the file of this patent

UNITED STATES PATENTS

| | | |
|---|---|---|
| 1,756,497 | Warren | Apr. 29, 1930 |
| 2,831,770 | Antoshkiew | Apr. 22, 1958 |
| 2,946,685 | Ross | July 26, 1960 |
| 3,080,285 | Odenwald et al. | Mar. 5, 1963 |

FOREIGN PATENTS

| | | |
|---|---|---|
| 18,231 | Great Britain | 1889 |